(No Model.) 2 Sheets—Sheet 2.
J. T. SHILLING.
WIND WHEEL.
No. 565,804. Patented Aug. 11, 1896.
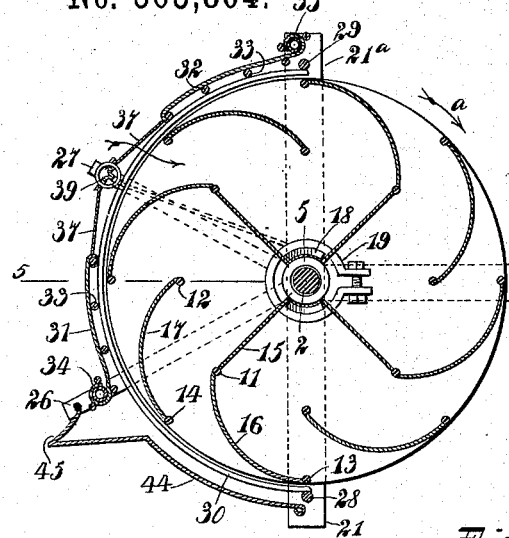
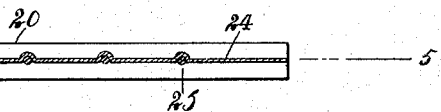
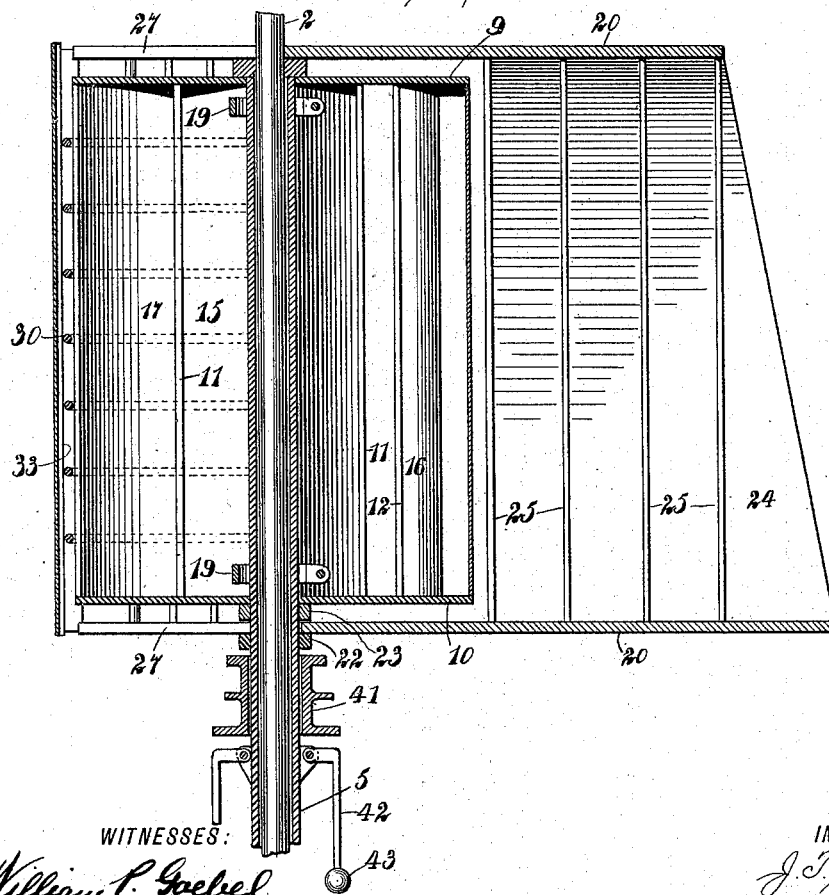
WITNESSES:
William P. Goebel.
C. R. Ferguson
INVENTOR
J. T. Shilling
BY
ATTORNEYS.

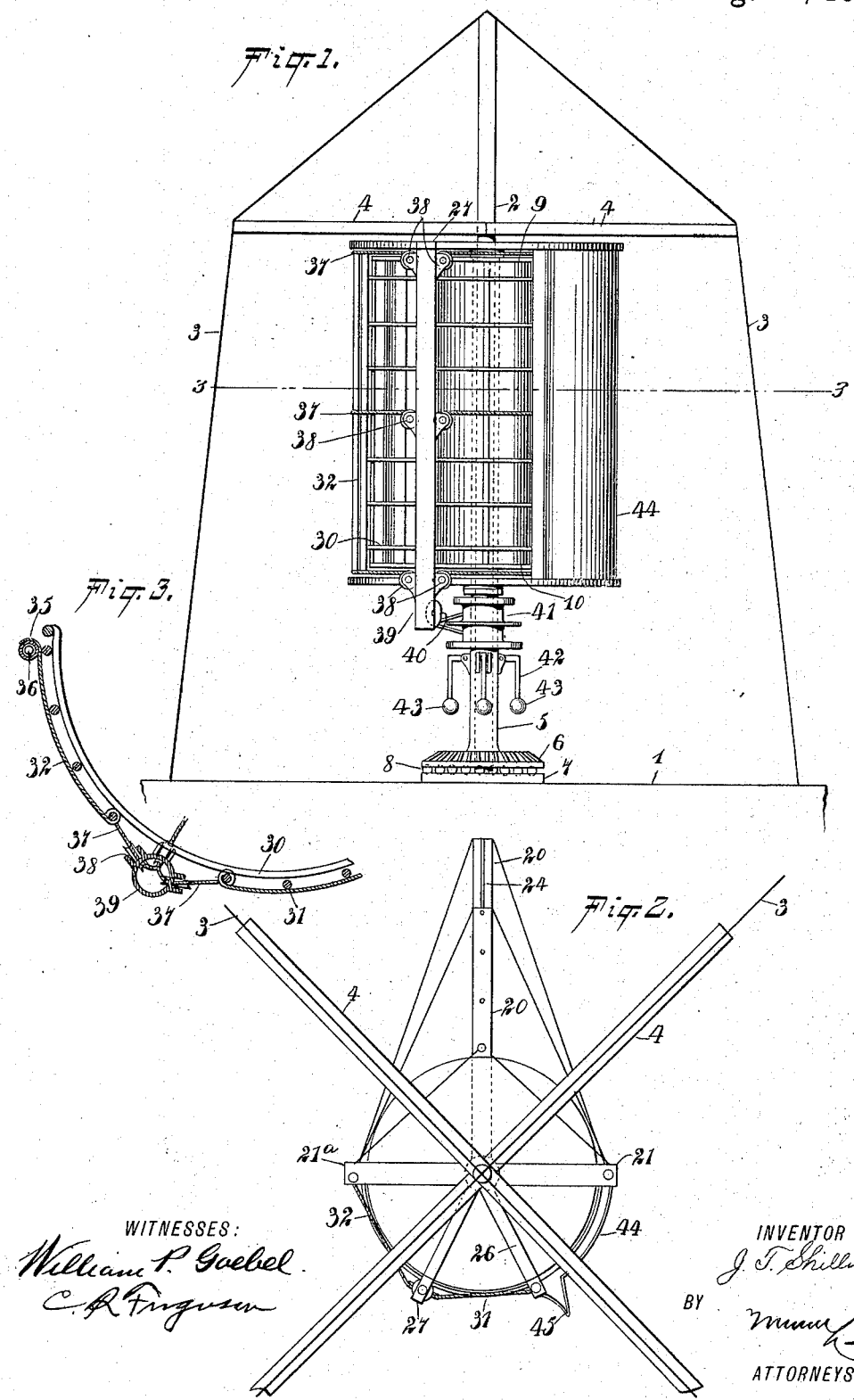

UNITED STATES PATENT OFFICE.

JOHN T. SHILLING, OF FISHER'S, NEW YORK.

WIND-WHEEL.

SPECIFICATION forming part of Letters Patent No. 565,804, dated August 11, 1896.

Application filed March 12, 1896. Serial No. 582,857. (No model.)

*To all whom it may concern:*

Be it known that I, JOHN T. SHILLING, of Fisher's, in the county of Ontario and State of New York, have invented certain new and useful Improvements in Wind-Wheels, of which the following is a full, clear, and exact description.

This invention relates to wind-wheels of the class designed to rotate on a vertical axis; and the object is to provide such a wheel so constructed that it will quickly adapt itself to the variations of velocity and direction of the wind and maintain a substantially even speed and power notwithstanding the changes in wind velocity.

The invention consists in the construction and novel arrangement of parts, as will be hereinafter specified, and particularly pointed out in the appended claims.

Reference is to be had to the accompanying drawings, forming a part of this specification, in which similar characters of reference indicate corresponding parts in all the figures.

Figure 1 is a front elevation of a wind-wheel embodying my invention. Fig. 2 is a top plan view thereof. Fig. 3 is a section of a portion of the device, taken on the line 3 3 in Fig. 1. Fig. 4 is a horizontal section, and Fig. 5 is a vertical section on the line 5 5 of Fig. 4.

Referring to the drawings, 1 designates a base having affixed to it a vertical shaft 2, which forms the axis of the wind-wheel, and the upper portion of the shaft may be braced by means of guy-lines 3, engaging with the upper end of the shaft and passing over the ends of arms 4, radiating from the shaft, to connections with the base. Mounted to rotate on the shaft 2 is a tubular shaft 5, the lower end of which has an annular flange 6, and between this flange 6 and a plate 7 on the base is placed a series of antifriction-balls 8.

The wind-wheel is mounted on and is designed to rotate the tubular shaft 5, and it comprises disks 9 10, secured to the tubular shaft, and extended between the disks is an inner circular row of metal rods 11 12 and an outer circular row of metal rods 13 14. Extended radially from the tubular shaft 5 to the rods 11 are sails 15, and extended tangentially between rods 11 and 13 are blades 16, and extended tangentially between rods 12 and 14 are supplemental blades 17. All of the sails and blades are of flexible material, such, for instance, as canvas. The blades are, as shown, somewhat wider than the distance between the rods to which they are attached, so as to form pockets under the wind-pressure, and, as here shown, pairs of sails 15 may consist of a single piece of material secured to the tubular shaft by means of segmental blocks 18, locked in position by means of bands 19, having outwardly-extended open ends engaged by clamping-screws.

It will be seen that rods 11 and 14 are in the same radial line, that the rods 12 and 13 are in the same radial line, and that the blades 16 and 17 alternate, and, further, that there is a space between the inner edges of the blades 17 and the axis of the wheel.

An auxiliary frame, comprising upper and lower cross-bars 20 21 21$^a$, is mounted on and adapted to rotate relatively to the tubular shaft 5. The upper cross-bars 20 21 21$^a$ are here shown as having a bearing around the shaft 2 and a collar secured thereto, and the lower cross-bars have a bearing around the tubular shaft between collars 22 23, affixed to the shaft. The upper and lower bars 20 extend considerably beyond the circumference of the wheel and support a vane 24, consisting of canvas or similar material, secured at its ends to the bars 20 and also secured to rods 25, which may be of metal, extended between the bars 20.

Extended forward and in a divergent manner from the junction of the cross-bars 20 21 21$^a$ are arms 26 27. Rods 28 29 have their upper ends secured to outer end portions of the upper oppositely-extended bars 21 21$^a$ and their lower ends secured to the lower oppositely-extended bars 21 21$^a$, and a series of horizontally-extended curved bars 30 have their opposite ends secured, respectively, to the rods 28 29. These rods 30 embrace or extend around the front half of the wind-wheel and serve as guides for damper-curtains 31 32, adapted to be automatically moved toward and from each other to more or less restrict the opening for the passage of wind to the wheel.

The curtains 31 32 consist of flexible material, such as canvas, and they are here shown as supported by stay-rods 33, secured to and extended vertically of the curtains and adapted to bear upon the guide-rods 30. The rear edge of the curtain 31 is secured to a roller 34, having bearings in upper and lower arms 26, and the rear edge of the curtain 32 is secured to a roller 35, having bearings in upper and lower bars 21ª. These rollers are spring rollers or have springs connected therewith, by means of which they are rotated in a direction to roll the curtains. As here shown, the rollers are tubular at one end, and in the tubular portion of each roller is seated a coil-spring 36, the inner end being secured to the roller and the outer end being secured to a bar 21ª or to an arm 26, as the case may be. The adjacent free edges of the curtains 31 32 are attached to ropes 37, which extend over pulleys 38, mounted on a hollow standard 39, supported between the upper and lower arms 27. The ropes extend through openings in the sides of the standard, down through the interior of the standard, and out around pulleys 40 to connections with a drum 41, mounted loosely on the tubular shaft 5 below the collar 22.

I also provide a governor for the wind-wheel. This governor, as here shown, consists of angle-arms 42, pivoted to lugs extended from the shaft 5 below the drum 41, and each arm 42 is provided with a weight 43 at its free end. It may be here stated that the governor comprises, in fact, the weighted arms 42, the drum 41, and the damper-curtains 31 32, as by the coaction of these parts the amount of wind admitted to the wheel is regulated.

An apron 44 has its rear edge secured to a rod extended between the upper and lower bars 21, and its forward edge is secured to a rod extended between the upper and lower arms 26. At its forward portion the apron 44 has a radially-extended sail-like portion 45, which, it will be seen, is at one side of the line of the vane 24. This portion 45 is in effect an auxiliary vane at the front portion of the auxiliary frame, and serves by variations in wind-pressure to more or less rotate the auxiliary frame in an opposite direction to that of the wind-wheel to hold the opening between the damper-curtains in a direct line with the wind.

In operation the propelling wind will enter between the curtains 31 32 and rotate the wheel in the direction indicated by the arrow a, Fig. 4. The wind strikes the blades at one side of the axis of the wheel and exhausts at the opposite side. Should the wind increase in force, the rotation of the shaft 5 will cause the ends of the arms 42 to swing outward, and their angle portions by engaging with the lower end of the drum 41 will raise the same into frictional contact with the collar 22, so that said drum will rotate with the wheel and draw the damper-curtains toward each other to reduce the space between them and consequently reduce the amount of wind admitted to the wheel. As the wind diminishes the frictional bearing between the drum 41 and collar 22 will be reduced, so that the spring-operated rollers will separate the curtains more or less, and thus it will be seen that the speed of the wind-wheel will be practically uniform.

The flange 6 may have gear-teeth, as indicated, to engage with either a vertical or horizontal shaft.

Having thus described my invention, I claim as new and desire to secure by Letters Patent—

1. A wind-wheel, comprising a fixed vertical shaft, a tubular shaft mounted to rotate thereon, and a wheel consisting of sails radiating from the tubular shaft, blades extended substantially at a tangent from the sails to the periphery of the wheel, and other blades arranged between the first-named blades and having a space between them and the axis of the wheel, substantially as specified.

2. A wind-wheel, comprising blades and sails mounted to rotate on a vertical shaft, an auxiliary frame mounted to rotate relatively to the wheel, a vane carried by said auxiliary frame, a damper-curtain carried by the auxiliary frame, and means for automatically moving said curtain in both directions circumferentially of the wheel and circumferentially of the frame, substantially as specified.

3. A wind-wheel, comprising blades mounted to rotate on a vertical shaft, an auxiliary frame mounted to rotate relatively to the wheel, a vane carried by said frame, a damper-curtain carried by the frame, a spring-operated roller for moving said curtain in one direction, and a connection between said curtain and a device adapted for frictional contact with the wheel to move the curtain in the opposite direction, substantially as specified.

4. A wind-wheel, comprising blades mounted to rotate on a vertical shaft, an auxiliary frame mounted to rotate relatively to the wheel, a vane on said frame, curtains carried by the frame for regulating the amount of wind admitted to the wheel, means for simultaneously moving the curtains in opposite directions and an auxiliary vane carried by said frame forward of and at one side of the first-named vane, substantially as specified.

5. A wind-wheel, comprising a tubular shaft mounted to rotate on a vertical axis, vertical sails extended radially from the tubular shaft, and devices for fastening the sails to the shaft, consisting of segment-blocks and clamping-rings, substantially as specified.

6. A wind-wheel, comprising a tubular shaft mounted to rotate on a vertical axis, disks mounted on said shaft, an inner row of rods extended vertically between the disks, an outer row of rods extended vertically between the disks, sails extended between the shaft and certain of the inner row of rods, blades extended between said inner rods to certain of the outer row of rods, and blades extended from the others of the outer row of rods to the others of the inner row of rods, substantially as specified.

7. A wind-wheel, comprising blades mounted to rotate on a vertical axis, an auxiliary frame mounted to rotate relatively to the wheel and consisting of cross-bars, a vane supported by the longer ones of said cross-bars, rods connecting the upper and lower shorter cross-bars, curved guide-rods supported by said rods, curtains of flexible material mounted to move on said guide-rods, and means for moving the said curtains toward and from each other, substantially as specified.

8. The combination with a wind-wheel mounted to rotate on a vertical axis, of a frame mounted to rotate relatively to said wheel, damper-curtains carried by said frame, spring-operated rollers for moving the curtains in one direction, a drum adapted for frictional contact with the wheel, flexible connections between the drum and curtains, and centrifugally-operating arms for moving the drum into engagement with the wheel, substantially as specified.

9. The combination with a wind-wheel mounted to rotate on a vertical axis, of a frame mounted to rotate relatively to the wheel, curved guide-rods carried by said frame, curtains of flexible material movable on said guide-rods, vertical stay-rods for said curtains, spring-operated rollers for moving said curtains in one direction, and means operated by the wheel for moving said curtains in the opposite directions, substantially as specified.

JOHN T. SHILLING.

Witnesses:
JAMES BRIGGS,
GEORGE H. HUMPHREY.